May 21, 1968 W. J. DRAVING 3,384,731
METHODS AND APPARATUS FOR BUTT WELDING WIRES AND THE
ARTICLE PRODUCED THEREFROM
Original Filed Oct. 28, 1964 3 Sheets-Sheet 1
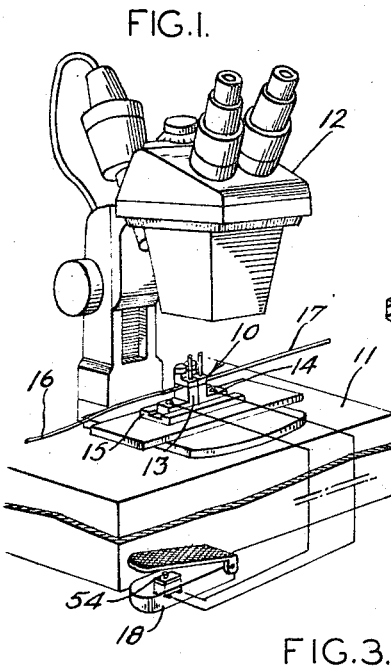
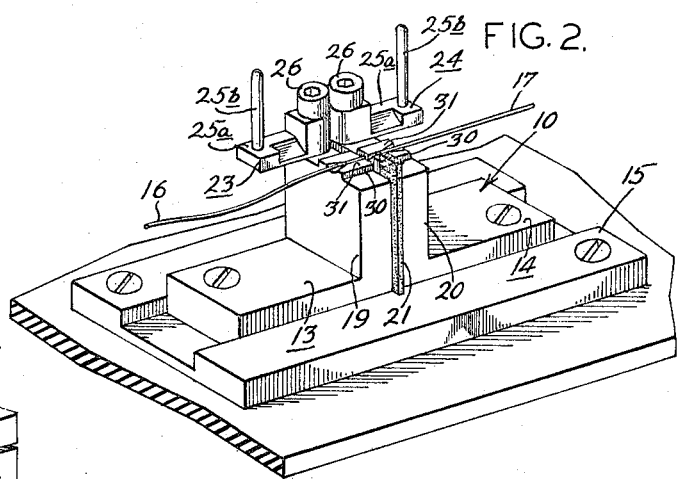
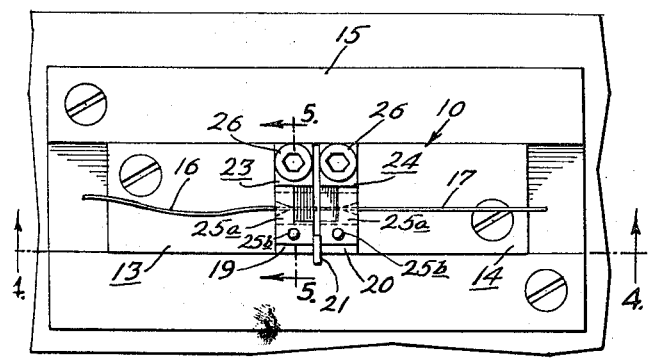
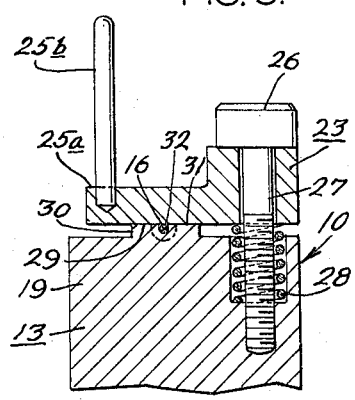
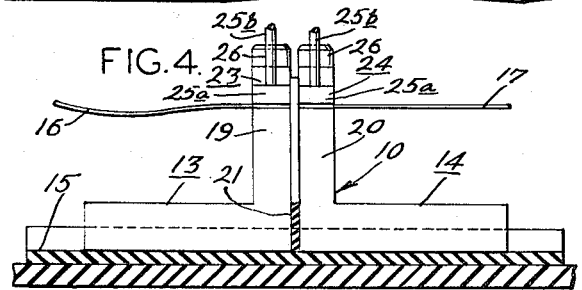
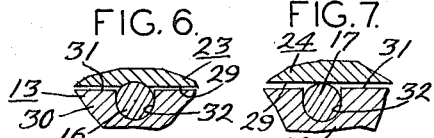
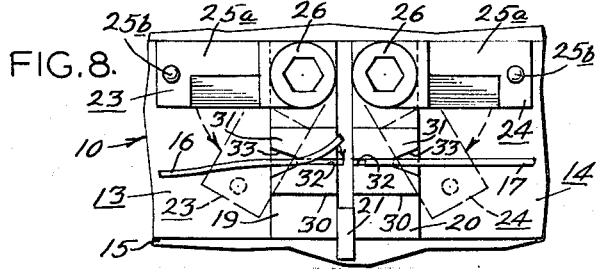
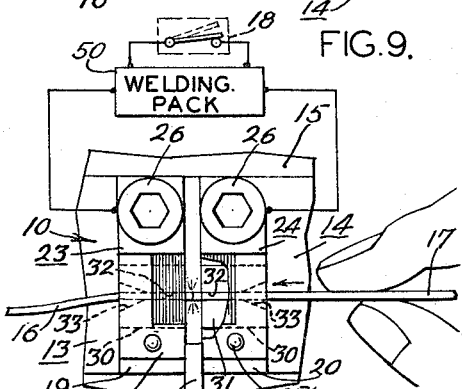
INVENTOR:
WALTER J. DRAVING
BY Howson & Howson
ATTYS.

May 21, 1968  W. J. DRAVING  3,384,731
METHODS AND APPARATUS FOR BUTT WELDING WIRES AND THE
ARTICLE PRODUCED THEREFROM
Original Filed Oct. 28, 1964  3 Sheets-Sheet 2

INVENTOR:
WALTER J. DRAVING
BY Howson & Howson
ATTYS.

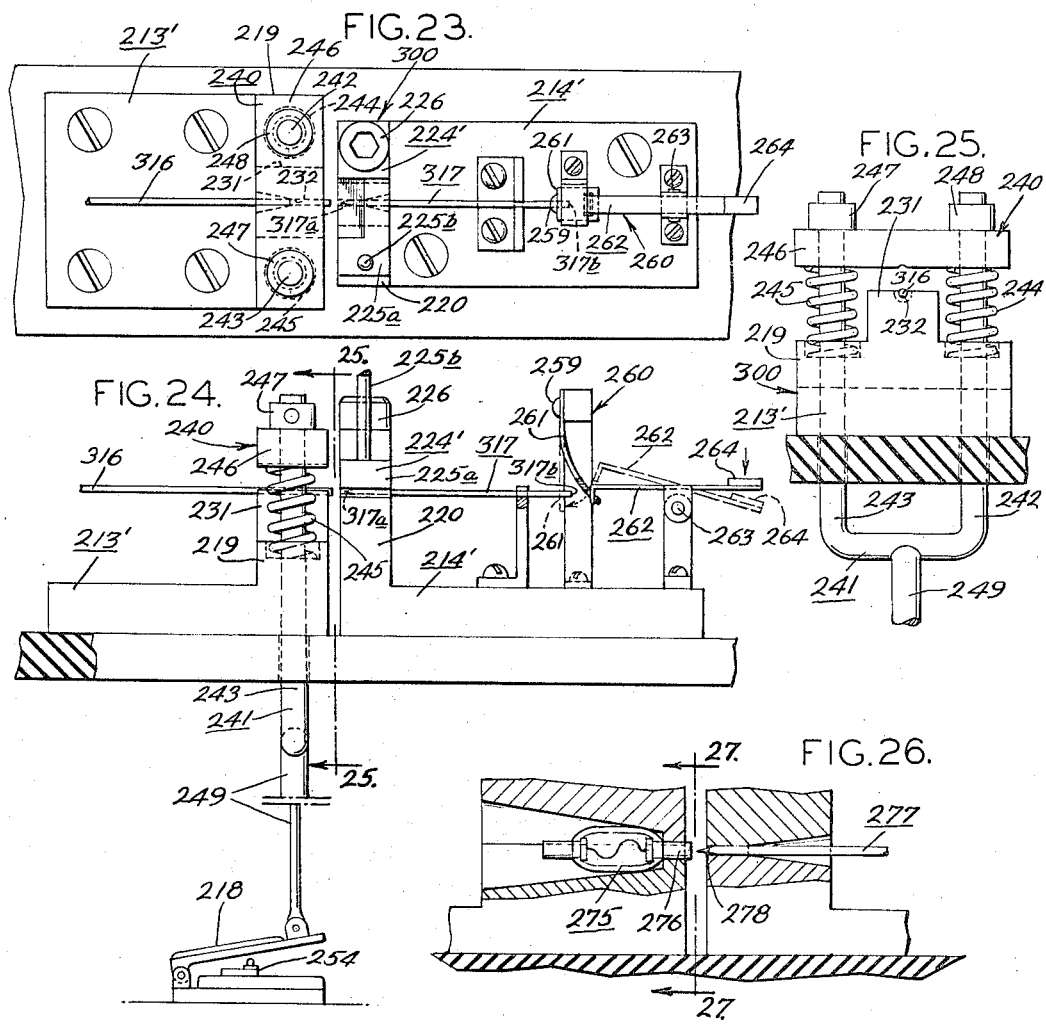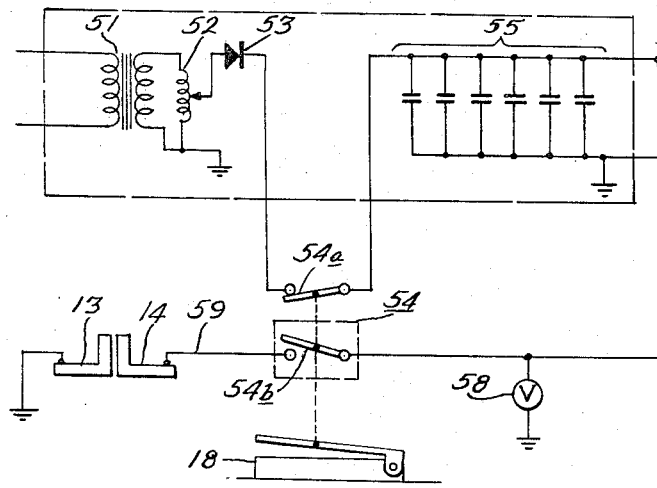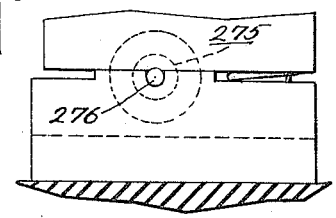

United States Patent Office 3,384,731
Patented May 21, 1968

---

3,384,731
METHODS AND APPARATUS FOR BUTT WELD-ING WIRES AND THE ARTICLE PRODUCED THEREFROM
Walter J. Draving, Willow Grove, Pa., assignor to Philadelphia Metal Stamping Company, Inc., Philadelphia, Pa., a corporation of Pennsylvania
Continuation-in-part of application Ser. No. 315,884, Oct. 14, 1963, and a continuation of application Ser. No. 407,204, Oct. 28, 1964. This application May 18, 1967, Ser. No. 639,588
24 Claims. (Cl. 219—57)

ABSTRACT OF THE DISCLOSURE

This patent discloses a method of and apparatus for welding together small workpieces including one of the novel articles as a product of the method. The method discloses welding together such workpieces by utilizing novel apparatus including a pair of fixedly spaced electrode die-holders, one of the die-holders serving to rigidly clamp one of the workpieces thereto while the other of the die holders having means for loosely clamping the other of the workpieces. After the workpieces are thus positioned, a potential is applied between the die-holders and the loosely clamped workpiece is moved into contact with the other workpiece thereby discharging the potential through the workpieces causing a weld to be effected.

---

This application is a continuation-in-part of the co-pending application, S.N. 315,884, filed October 14, 1963, now abandoned, and a continuation of co-pending application Ser. No. 407,204, also now abandoned.

The present invention relates to methods and apparatus for welding wires or the like and more particularly relates to methods and apparatus for electrical-resistance welding and the resultant products therefrom.

Welding techniques and apparatus currently available on the market pertaining to welding of small diameter wires and the like have very common shortcomings. They are bulky, relatively expensive, and despite their excellence of engineering design are only capable of achieving good welds approximately 50% of the time. Further, when end-to-end welding two wires of differing diameters and/or having the same or differing physical characteristics, the percentage of good welds from any of these machines is decreased.

The welding methods presently employed may be divided into three general classifications, Butt Welding, Flash Welding, and Percussion Welding. In the butt welding process the pieces to be welded together are clamped, brought together and a high pressure between 2500 and 8000 p.s.i. is applied and thereafter a heavy current is passed through the two pieces thereby effecting a weld at the junction of the pieces. It is obvious, with soft wires or wires of relatively minor diameters, alignment of the pieces in addition to extreme pressures applied is extremely difficult and oftentimes an upsetting of the joint occurs. Further, if two dissimilar metals are to be welded, the metal projecting from the electrode die-holders must be in proportion to the specific resistance of the materials to be welded which, of course, adds to the difficulty in alignment and applying the high pressures to effect a good weld. These comments also apply where material of differing cross sections are butt welded.

In flash welding, the parts are first clamped, then brought together in very light contact and then a high voltage starts a flashing action between the two surfaces as the parts advance slowly and the forging temperature is attained. The weld is only completed thereafter by the application of sufficient forging pressure, which may range from 5000 to 25,000 p.s.i. Further, although certain non-ferrous metals are capable of flash welding, alloys containing high percentages of lead, zinc, tin, and copper are not recommended for use in this process. As in butt welding, the use of flash welding techniques in welding small diameter workpieces or wires is inadequate because of the high pressures necessary to effect a good weld.

In percussion welding the pieces are clamped approximately $\frac{1}{16}$ of an inch apart and a high voltage is applied causing intense arcing over the surfaces bringing them to a high temperature. The arc is extinguished by the percussion blow of the two parts coming together with sufficient force to form a weld. As before, the equipment utilized for percussion welding is expensive since it is extremely rugged and must be provided with accurate holding fixtures and with elaborate electrical timing devices and large transformer capacities.

As may be seen from the foregoing, there are several major disadvantages inherent in the present day apparatus and techniques of welding small diameter workpieces or wires. It is obvious, that wires having dissimilar bending properties will experience alignment difficulties upon the application of relatively large amounts of force, which force is necessary in all three of the foregoing conventional techniques. Further, heretofore it has been felt necessary that both pieces to be welded must be securely clamped because of the necessity of decreasing the resistance of the die-holder to the workpieces at the point of clamping thereby preventing a weld from being effected at those points to their respective workpiece. In addition, when clamping and bringing the two pieces together via displacement of the clamping die-holders, the workpieces have to have an inherent physical size and structural strength sufficient to withstand and overcome the inertia of the clamps upon the welding pressure being applied. Unfortunately, small wires do not have these structural qualifications.

In view of the above, it is a principal object of the present invention to provide welding methods and apparatus therefore, which apparatus and methods will permit of welding together two or more small work pieces in a simple and economical manner.

Another object of the present invention is to provide novel electrode die-holders which permit relative movement of one workpiece with respect to the other without the necessity of moving the electrode die-holders.

Another object of the present invention is to provide a method of welding or a welding technique which permits a good weld between a single wire and a multiplicity of wires each having a smaller diameter than the single wire.

Another object of the present invention is to provide apparatus which permits of welding a multiplicity of workpieces to a workpiece having a larger diameter, in one operation.

Still another object of the present invention is to provide a novel method and apparatus of welding workpieces having a larger diameter.

Another object of the present invention is to provide novel apparatus and a novel method of welding which permits welds to be made to micro-miniature electronic parts.

Still another object of the present invention is to provide apparatus which is easily adjustable and permits easy axial alignment of wires in the electrode die-holders.

Another object of the present invention is to provide apparatus which will automatically, upon engagement with the wires, cause straightening thereof so as to insure automatic alignment between the two pieces to be welded.

Other objects and a fuller understanding of the invention may be had by referring to the following specification and claims taken in conjunction with the accompanying drawings in which:

FIG. 1 is a fragmentary perspective view showing schematically apparatus constructed in accordance with the present invention;

FIG. 2 is an enlarged fragmentary perspective view of a portion of the apparatus illustrated in FIG. 1;

FIG. 3 is an enlarged plan view of a portion of the apparatus illustrated in FIG. 2;

FIG. 4 is a fragmentary sectional view taken along line 4—4 of FIG. 3;

FIG. 5 is an enlarged fragmentary sectional view taken along line 5—5 of FIG. 3;

FIG. 6 is an enlarged sectional view of a portion of the apparatus illustrated in FIG. 5;

FIG. 7 is an enlarged fragmentary sectional view, similar to FIG. 6, and illustrating another portion of the apparatus shown in FIG. 3;

FIG. 8 is an enlarged plan view of a portion of the apparatus shown in FIG. 3 and in a different position so as to illustrate more accurately the placement of work pieces relative thereto;

FIG. 9 is a fragmentary plan view illustrating schematically, in part, the operation of apparatus illustrated in FIGS. 1–8;

FIG. 23 is a fragmentary plan view of another embodiment of the invention;

FIG. 24 is a profile of the apparatus illustrated in FIG. 23;

FIG. 25 is a fragmentary sectional view taken along line 25—25 of FIG. 24;

FIG. 26 is a fragmentary enlarged sectional view of a portion of the apparatus illustrated in FIG. 24 and wherein one of the work pieces is an electronic part;

FIG. 27 is a sectional view taken along line 27—27 of FIG. 26; and

FIG. 28 is a schematic wiring diagram of a typical welding unit utilized in conjunction with apparatus constructed in accordance with the present invention.

Figure 10:
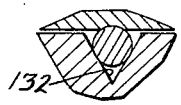
FIGS. 10 and 11 illustrate different embodiments of a portion of the apparatus constructed in accordance with the present invention.
Figure 11:
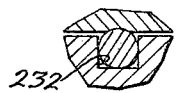

Referring now to the drawings, and especially FIG. 1 thereof, a simplified schematic representation of welding apparatus 10 mounted on a stand or work bench 11 and having an adjustable magnification viewing piece 12, is illustrated therein. As illustrated in FIGS. 1 and 2, the welding apparatus 10 comprises a pair of electrode die-holders 13 and 14 mounted in an insulated block 15 secured to the work table 11. Clamps 23 and 24, connected to the welding apparatus 10, operate to clamp work pieces, in the present instance wires 16 and 17, to the electrode die-holders 13 and 14 respectively. As shown in FIG. 9, a welding pack 50 is connected to the electrode die-holders 13 and 14 and put into operation via a foot switch 18.

In accordance with the method of the present invention, at least one of the work pieces is clamped to its associated electrode die-holder while the other work piece is aligned with the first work piece and loosely clamped to the other electrode die-holder. Upon applying a potential between the electrodes, the loosely engaged work piece is moved relative to the fixedly clamped work piece until the work pieces contact one another thereby discharging the potential through the work pieces and causing them to weld together at their junction.

Because the techniques and apparatus for welding relatively small diameter wires or work pieces differ, in accordance with the diameter of the work piece, the physical and/or chemical characteristics of the work piece, and whether or not it is desired to retain approximately the same overall dimensions of the work piece, the remaining portion of the specification is conveniently divided into two parts; the first part dealing with "A Method and Apparatus for Welding Small Diameter Work Pieces," and the second section dealing with "A Method and Apparatus for Welding Large Diameter Work pieces."

A METHOD AND APPARATUS FOR WELDING SMALL DIAMETER WORK PIECES

As the method and apparatus disclosed hereinafter is also applicable to certain diameter work pieces which may be classified in the second section of this specification, it should be recognized from the outset that the method and apparatus are not capable of a fixed boundary with respect to the diameter cf the work pieces and that some overlapping is possible. In this section, small diameter wires will be referred to as including wires from below .0001 of an inch to approximately .125 of an inch.

Referring now to the drawings, it is noted that the electrode die-holders 13 and 14 are L-shaped each having an upstanding leg 19 and 20 respectively and spaced from each other so as to receive therebetween an insulator 21. At the extended terminus of the legs, work piece receiving means 30 are provided to receive, in the present instance, the small diameter wires 16 and 17, and to permit axial alignment of the wires when inserted therein.

In the illustrated instance the receiving means 30, associated with each of the legs 19 and 20 of the electrode die-holders 13 and 14, comprises a pedestal or raised portion 31 having a groove 32 and a rearward terminal recession 33, the purpose of which will more fully be described hereinafter.

Positioned above each of the wire receiving means 30 are the clamps 23 and 24, at least one of which acts upon its associated work piece or wire to fixedly engage the wire in its groove with a small portion projecting into the space defined between the legs 19 and 20. To this end, and as best illustrated in FIG. 5, each of the clamps has a horizontal extension 25a having a handle 25b at one end and pivotably secured to its associated leg by adjustment means at the other end. In the present instance the adjustment means comprises a bolt 26 having a shoulder 27 permitting rotatable movement of the clamp, and permitting vertical adjustment thereof due to the biasing effect of a spring 28. In this manner one clamp, in the present instance clamp 23, may firmly engage the wire in the groove 32 while the other clamp, in the present instance clamp 24, may loosely engage the other wire 17. To insure maximum flexibility of the apparatus, as different diameter wires may be inserted into the groove associated with the wire receiving means of either leg 19 or 20, the clamps should be adjustable in order to raise and lower the extension 25a so as to insure proper seating of the wire in its associated groove.

As it is desirable that wires placed in the grooves are easily alignable, and as in many instances the wires inserted in the wire receiving means may be bent, the clamps are provided with means to straighten the wires. To this end, and in accordance with a feature of the invention, the portion of each clamp which engages with the wire to cause it to be placed in a groove is provided with a portion 29, parallel to the pedestal 31 (see FIG. 5), and which cooperates with the recess or groove 33 to permit engagement of the surface 29 against a bent wire in a wiping action which moves the wire into the groove 32 thereby straightening it. Such an action is illustrated in FIG. 8.

It is important to note the relative position of the clamps 23 and 24 with respect to the wires 16 and 17. As previously set forth and as seen in FIG. 6, one of the clamps, in the present instance clamp 23, is adjusted so that the surface 29 presses the wire 16 firmly into the groove 32 while the other clamp, in the present instance clamp 24, is adjusted so that the surface 29 just engages the upper portion of the work piece or wire 17 in its associated groove 32. This of course permits movement of the wire 17 relative to the wire 16 in a manner which will be more fully described hereinafter. Although the shape of the groove 32 as illustrated in FIGS. 6 and 7 is U shaped, a V-shaped groove 132 such as illustrated in FIG. 10 or a rectangular shaped groove 232 as well as any groove shape which permits contact between the wire and the electrode may also be used.

Figure 17:
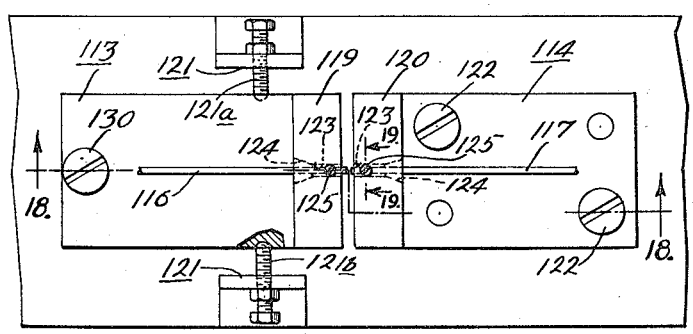
FIG. 17 is plan view of another embodiment of the invention.
Figure 18:
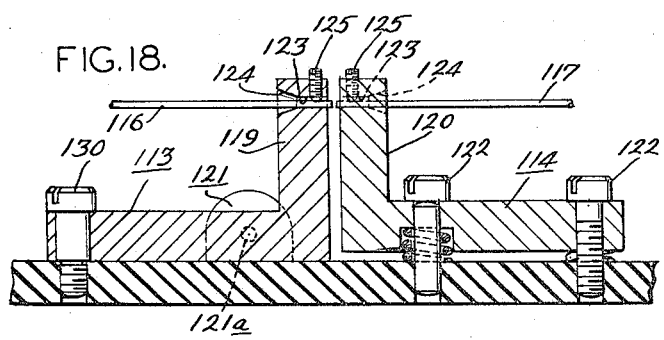
FIG. 18 is a fragmentary sectional view taken along line 18—18 of FIG. 17.

As it is desirable to achieve perfect alignment of the goroves, it may be desirable to provide means to move the electrode die-holders relative to each other so that the grooves may be aligned in both the horizontal and vertical planes. To this end, apparatus such as previously described is illustrated in FIGS. 17 and 18 wherein a pair of L-shaped electrode die-holders 113 and 114 having upstanding legs 119 and 120 respectively are spaced from one another and provided with horizontal adjustment means 121 and vertical adjustment means 122. As it is necessary to adjust only one of the electrode die-holders with respect to the other in either plane, the horizontal plane adjustment means, in the present instance, is located on the die-holder 113 while the vertical plane adjustment means 122 is located on the die-holder 114. The horizontal adjustment means in the present instance comprises a pair of presettable screws 121a and 121b which bear against the die-holder 113 permitting it to be adjusted relative to a hold-down screw 130.

Figure 19:
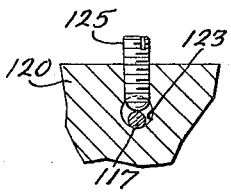
FIG. 19 is an enlarged fragmentary sectional view of portion of the apparatus illustrated in FIG. 17 and taken along line 19—19.
Figure 22:
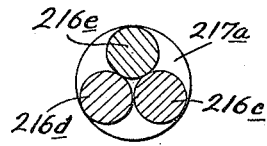
FIG. 22 is an enlarged fragmentary sectional view taken along line 22—22 of FIG. 21.

Although the clamp as heretofore described is preferable in combination with the wire receiving means, where the wires to be welded have consistent linearity in the longitudinal direction, the groove for receiving the wire 116 or 117 may comprise an aperture 123 with an outwardly directed conical countersink 124 which permits easy alignment of the wires in the grooves. In this instance, the means to clamp the wire with respect to the groove may take the form of a simple set screw 125 such as illustrated in FIG. 19. Of course as before, one of the wires, for example the wire 116 is rigidly clamped with respect to the leg 119 while the other wire 117 is loosely clamped by its set screw so that the wire 117 may be brought into contact with the other wire 116.

In practice, the welding of wires having the same or differing physical characteristics and the same or differing diameters within the range of small diameter wires as heretofore described, requires a relatively light current discharge to effect a good weld. To this end, a very simple welding pack 50 may be provided so as to permit selective adjustment of the current discharge. In the present instance, the welding apparatus is preferably of the capacitive discharge type although pulse type electromagnetic discharge welding machines or magneto type pulse system could be used with appropriate timing mechanism to insure placement of the potential on the wires prior to bringing the wires together. However, because of the relative simplicity of capacitive discharge welding apparatus, it is to be desired. In FIG. 28, such apparatus is illustrated and comprises an isolation transformer 51 which inductively couples A.C. to its secondary, and an auto-transformer 52 which permits adjustment of the A.C. voltage to a rectifier 53. The rectifier permits a D.C. potential to be applied to switching means, in the present instance as illustrated a double pole single throw switch 54, one pole 54a of which is normally closed, the other pole 54b of which is normally open. The normally closed portion of the switch 54 connects the rectifier 53 to a bank of capacitors 55 which includes plug-in means, such as illustrated at 56 and 57 for adding additional capacitance in parallel with the capacitors 55 across the power supply. A volt meter 58 is connected in parallel with the capacitors so as to afford a convenient method of reading the voltage being applied to the pole 54b of the switch 54. The normally open portion of the switch 54b is electrically connected through a lead 59 to an electrode die-holder and mechanically connected to the foot switch 18.

As may be noted from the simple schematic, upon the normally open pole 54b of the switch 54 being depressed, so as to cause continuity to be made between the capacitors and one of the electrode die-holders, the other pole 54a is opened, thereby disconnecting the rectifier 53 from the capacitive bank 55. As the other of the electrode die-holders is connected to ground, or common with the grounded side of the capacitive bank, upon the switch 54 being actuated a potential is placed upon one of the wires being held by the electrode die-holder and the circuit is completed for discharge of the capacitors upon the wires meeting. It should be noted that the switch means may take many forms, for example, an electronic switch or relay type switch.

Figure 9A:
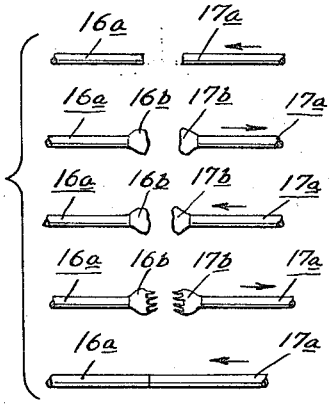
FIG. 9a is a fragmentary schematic illustration of the movement of work pieces to effect a weld in accordance with the invention.
Figure 20:
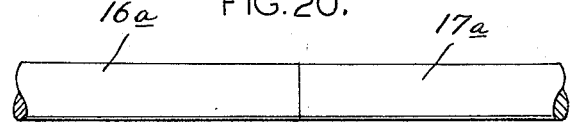
FIG. 20 is a fragmentary enlarged view of work pieces joined by a weld in accordance with the present invention and the apparatus heretofore illustrated.
Figure 21:
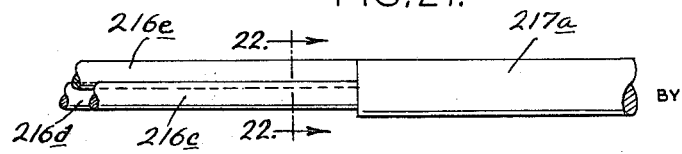
FIG. 21 is an enlarged fragmentary view of a multiplicity of work pieces welded end to end in accordance with the apparatus and method of the present invention.

The method of welding small diameter wires, specific examples of which will be set forth hereinafter, is illustratively depicted in FIG. 9a wherein a small diameter wire 16a is assumed to be fixed in one of its die-holders 13 by its associated clamp while the other wire 17a is assumed to be loosely clamped in its die-holder such as the die-holder 14 illustrated in FIG. 9. Thereafter the foot switch 18 actuates the switch 54 to apply the charge on the bank of capacitors 55 (see FIG. 28) to the wire 17a thus creating a potential difference between the wire 17a and the wire 16a. The wire 17a is then moved rapidly towards the wire 16a and upon contact the capacitor bank is discharged through the wires causing the wires to form molten bulbs 16b and 17b respectively as shown in FIG. 9a. The wire 17b is thereupon disengaged and moved to the right. The foot switch is released and the capacitors once again are permitted to charge. Once again the foot switch 18 is depressed and the capacitive charge of the capacitors 55 is placed on the wire 17a. Thereafter the wire 17a is brought towards the wire 16a and permitted to butt thereagainst. Upon the wire 17a striking the wire 16a the capacitors are once again discharged. This time upon removal of the wire 17a or withdrawal from the other wire 16a small tits appear on the ends of the bulb as if a partial weld had occurred and in the molten stage was pulled apart. Once again the foot switch is released and the capacitor bank is permitted to recharge. Thereafter the charge is re-applied and the wire 17a is once again brought against the wire 16a, and a weld is effected. Although the final weld, such as illustrated in an exaggerated fashion in FIG. 20, would appear to have to have a bulging at the joint, for some reason which is not entirely clear the metal appears to flow at the junction and form a cross section substantially identical with the cross section of the two wires. For example, a pair of wires having diameters of .020 of an inch, welded in this manner, is guaranteed in production welding, to fit through a hole having a diameter of .021 of an inch.

From the above discussion of the method of welding small diameter wires, it is evident that this method is particularly conductive to the formation of welds wherein it is desired to maintain rigid control both as to the size of the weld at its junction, and the relative length of the wires. The reason for this is that relatively little or no metal is lost in the welding process. It further should be noted that the wires to be welded together should not have extremely differing diameters as, it has been found, that this will prevent the formation of adequate welds. Thus while it is a simple matter to weld, for example, a .002 inch work piece to a .005 inch work piece, some difficulty may be encountered in attempting to weld, in the above manner, a .002 inch work piece to a .010 inch work piece.

As a practical matter, when welding two or more wires end to end, it is preferable that the stiffer of the two wires be the loosely engaged wire while the wire having the least bend resistance be fixedly engaged in the clamp.

Figure 12:
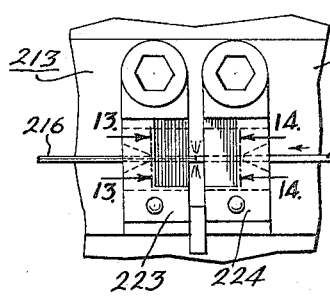
FIG. 12 is an enlarged plan view similar to that illustrated in FIG. 8 but showing the position of a multiplicity of work pieces relative to another work piece to which the former are to be welded.
Figure 13:
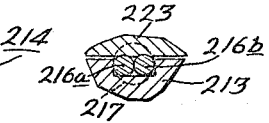
FIG. 13 is an enlarged fragmentary perspective view of a portion of the apparatus illustrated in FIG. 12 and taken along line 13—13.
Figure 14:
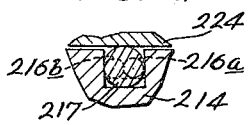
FIG. 14 is an enlarged fragmentary perspective view of a portion of the apparatus illustrated in FIG. 12 and taken along line 14—14 of FIG .12.

In accordance with the method of the present invention, a plurality of wires may be welded to a single wire end to end with apparatus similar to that disclosed in FIGS. 1–11 and as heretofore described. Such an embodiment, is illustrated in FIG. 12 wherein a pair of electrode die-holders 213 and 214 each have a clamp, 223 and 224 respectively, positioned relative thereto to receive work pieces. In the instance of the clamp 223 and electrode die-holder 213, a plurality of wires 216 is fixedly engaged therebetween, while a single wire 217 of slightly larger diameter to which the wires 216 are to be welded is, in a manner such as heretofore described, loosely engaged with respect to the die-holder 214 by its clamp 224. FIG. 13 illustrates two wires 216a and 216b respectively being fixedly engaged by the clamp 223 against the electrode die-holder 213 while FIG. 14 illustrates a view of the same as it would appear upon engagement of the wire 217 against the wires 216a and 216b.

Figure 15:
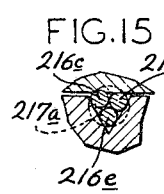
FIGS. 15 and 16 are enlarged fragmentary perspective views similar to that of FIGS. 13 and 14 and showing another embodiment of that portion of the apparatus, constructed in accordance with the present invention.
Figure 16:
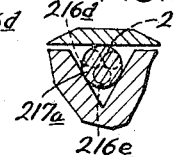

FIGS. 15 and 16 are illustrative of a three wire to one wire weld, the three wires once again being fixedly clamped while the larger wire is loosely clamped and brought into engagement, end to end, for welding thereof. As may be noted in FIGS. 15 and 16, the plurality of wires has been designated 216c, d, and e respectively while the larger diameter wire has been given the designation 217a.

Typical examples of wires welded in accordance with the above method and on apparatus as above described are given in the accompanying table and should be considered merely illustrative of wires welded in this manner. It should be noted that the ranges of capacitance and voltage given in the accompanying table may be varied considerably and still obtain a good weld by utilizing the method and apparatus as heretofore described. For example, variations in the particular alloy or alloying percentage or diametrical difference of small amounts may require slight differences in a voltage and/or capacitance in order that the best weld may be obtained. Thus the table set forth below will give one practicing the present invention a reasonable starting place.

| Materials Metal-to-Metal | | Diameter (inches) corres. to 1 and 2 in Materials Col. | | Voltage, volts | Capacitance, µfd. |
| --- | --- | --- | --- | --- | --- |
| 1 | 2 | | | | |
| Copper | Stainless Steel | .0015 | .006–.007 | 20–25 | 300–400 |
| Do | do | .0015 | .003–.004 | 30–40 | 50–100 |
| Beryllium Copper | Stainless Steel or Copper | .005 | .005 | 20–25 | 300–400 |
| Carbon Steel | Stainless Steel or Copper or Beryllium Copper | .003 | .002 | 20–25 | 300–400 |

A METHOD AND APPARATUS FOR WELDING LARGER DIAMETER WORKPIECES

Certain of the method and apparatus disclosed hereinafter is applicable to certain diameter workpieces or wire which also may be classified in the first section of this specification. Therefore, it should be recognized at the outset that the method of welding larger diameter wires is not capable of an absolute or fixed boundary with respect to the diameter or other physical characteristics of the workpieces and that some overlapping is possible. In this section, larger diameter workpieces will be referred to as including wires or the like having diameters approximately .003 of an inch to and in excess of .250 of an inch.

The method of welding larger diameter wires, as set forth hereinafter, permits the welding together of workpieces having greatly differing diameters while creating some flash and therefore loss of metal when the workpieces are joined. Thus utilizing the apparatus and/or the method as hereinafter set forth permits the welding of wires or the like to workpieces having substantially larger surface areas, which surface areas may have diameters greater than ½ inch, for example a disk.

Referring now to the drawings, although apparatus as heretofore described is equally applicable for use in welding workpieces having larger diameters, the apparatus illustrated in FIGS. 23–25 is to be preferred. As illustrated in FIGS. 23 and 24, the welding apparatus 300, illustrated therein, comprises a pair of electrode die-holders 213' and 214' each having an upstanding leg 219 and 220 respectively. At the extended terminus of the legs, workpiece receiving means are provided, in the present instance to receive larger diameter wires such as the wires 316 and 317, and to permit axial alignment of the wires in end to end relation when inserted therein. As heretofore described, the workpiece receiving means comprises a pedestal or raised portion 231 (see FIG. 25) having a groove 232 for receiving the wire therein.

As noted in FIG. 25, a clamp 224 serves to loosely engage the wire 317 against the leg 220 of the die-holder 214. Similar to that heretofore described, the clamp 224 comprises a horizontal extension 225a having a handle 225b at one end and pivotably secured to the leg 220 by adjustment means at the other end. In the present instance the adjustment means comprise a bolt 226 which permits rotatable movement of the clamp while simultaneously permitting vertical adjustment thereof due to the biasing effect of a spring or the like (not shown).

For reasons which will become evident hereinafter, a clamp 240 serves to fixedly engage the wire 316 to the leg 219 of the die-holder 213'. As best illustrated in FIGS. 24 and 25, the clamp 240 comprises a yoke 241 having a pair of upstanding legs 242 and 243 respectively biased upwardly by a pair of springs 244 and 245, which springs support at one end a clamping bar 246 and rest at their lower end on either side of the pedestal 231. Securing means 247 and 248 connect the terminal ends of the yoke 241 to the clamping bar 246 and thereby fix the distance between the upward terminus of the pedestal 231 and the lower portion of the clamping bar 246. In order to fixedly engage the wire 316 in its groove 232 and against the clamping bar 246 of the clamp 240, it is only necessary to depress a foot pedal 218 which through a stem 249 of the yoke 241, downwardly biases the yoke thereby causing the clamping bar 246 to firmly engage the wire 316. It should be noted, that the foot pedal 218 may be also used to cause actuation of the welding pack by a switch 254, which may be similar to the switch 54 as previously described with reference to FIG. 28.

When welding wires in accordance with the method of the present invention, it is preferred that at least one of the wires such as the wire 317 have a pointed terminus which will contact the other wire when the one wire is moved relative to the other. Such a pointed terminus is shown at 317a, which point was made by a simple finger nail clipper.

Further, and as stated before, although a capacitive discharge welding machine is desirable and preferable in the present application, a magneto-type discharge system or other electro-magnetic discharge system which gives a high pulse rate so as to approach D.C. also could be equally applicable for use in accordance with the present invention.

A method of welding larger diameter workpieces, specific examples of which will be set forth hereinafter, requires, that one of the workpieces such as the wire 316 be fixedly clamped in its electrode die-holder 213′, while the other workpiece or wire be loosely clamped in its electrode die-holder 214′. Further, it is desirable that one of the workpieces, if it is a wire, have a pointed terminus such as the terminus 317a on the wire 317. Thus, the foot pedal 218 causes the wire 316 to be fixed relative to the die-holder 213′ and simultaneously actuation of the welding pack occurs which causes a potential to be placed on the wire 317 relative to the wire 316. The wire 317 is then rapidly propelled towards the other fixed wire 316 and the potential is discharged to ground in a manner such as heretofore described. Unlike the method of welding small diameter workpieces, this process requires only a single movement of the workpiece relative to the other workpiece.

In practice, a common method of causing the wire 317 to be rapidly propelled against the exposed terminal end of the wire 316 is to strike the other terminal end 317b of the wire 317 with something hard. Although the blow is a relatively light one, it is sufficient to cause the wire to be propelled with the necessary speed to strike the other wire 316. Because of the extremely short distances involved, suffice to say that the blow is easily produced by cocking the hand an inch or so away from the terminal end 317b of the wire and striking that end of the wire in a rapid manner.

In order that during quantity production of welds a uniform velocity may be attained on the wire 317, automatic striking mechanism 260 may be provided such as that illustrated in FIGS. 23 and 24. In the present instance the automatic striking mechanism comprises a spring 261 positioned rearwardly of the terminus 317b of the wire 317 and anchored at a pivot 259. The spring 261 is held in a cocked position by a latch 262 having a pivot at 263, and a latch release 264. Upon depression of the latch release 264 about the pivot 263, the latch 262 is elevated to the dotted line position (see FIG. 24) and the spring 261 moves to the left or clockwise about its pivot 259 thereby propelling the wire 317 against the wire 316 whereby a weld is effected.

The welding of microminiature or larger electronic elements such as diodes, transistor leads, capacitor leads, disks, or the like, may be accomplished by either the small diameter work piece method or the larger diameter work piece method whichever is applicable under existing circumstances. However, as the relative diameters of the elements may vary considerably, the larger diameter method is more desirable.

An example of such a welding technique is shown in the greatly exaggerated view in FIG. 27, wherein a diode 275 having a wire or stem 276 is positioned for being welded to a lead wire 277. In the illustrated instance it is preferable to fixedly engage the stem 276 of the diode 275 and move the lead wire relative thereto. Assuming that the larger wire method is to be used, the diode is rigidly clamped, the wire 277, which is provided with a pointed terminus 278, is loosely engaged in the other die-holder and then a charge or potential is applied between the stem 276 and the wire 277 in a manner as heretofore described. The wire is then rapidly propelled towards the stem 276 and the charge is then dissipated to ground through the junction of the wire 277 and the stem 276 thereby effecting a weld.

Typical examples of wires welded in accordance with the above method and/or apparatus as above-described are given in the accompanying table and should be considered merely illustrative of wires welded in this manner. It should be noted that the ranges of capacitance and voltage given in the accompanying table may be varied considerably and still obtain a good weld by utilizing the method and apparatus as heretofore described. For example, variations in the particular alloy or alloying percentage or diametrical difference of small amounts may require slight differences in a voltage and/or capacitance in order that the best weld may be obtained. Thus the table set fourth below will give one practicing the present invention a reasonable starting place.

| Materials Metal-to-Metal | | Diameter (inches) corres. to 1 and 2 in Materials Col. | | Voltage, volts | Capacitance, μfd. |
|---|---|---|---|---|---|
| 1 | 2 | | | | |
| Nichrome Steel | Nichrome Steel. | .020 | .030 | 40-30 | 5,000-20,000 |
| Tungsten | Tungsten | .020 | .020 | 20-30 | 18,000-22,000 |
| Copper | Molybdenum | .010-.1030 | .020-.080 | 30-60 | 8,000-12,000 |
| Do | do | .030 | .045 | 55 | 9,000 |
| Silver | do | .028-.045 | .020-.080 | 70-100 | 8,000-12,000 |
| Nickel | do | .020 | .045 | 50 | 9,000 |

Thus novel welding apparatus and a novel method of welding are provided whereby one workpiece is held rigidly fixed relative to the other workpiece and the movable workpiece is brought into contact after a charge has been applied thereto thus creating a weld. As may be noted from the drawings, and in accordance with the method as heretofore set forth, a simple but novel and efficient apparatus and method are provided for effecting welds on relatively small diameter workpieces.

Although the invention has been described with a certain degree of particularity, it is understood that the present disclosure has been made only by way of example and that numerous changes in the details of construction, method of operation, and the combination and arrangement of parts may be made without departing from the spirit and the scope of the invention as hereinafter claimed.

What is claimed is:

1. A method of welding together at least two small workpieces in a welding machine having a pair of fixed-spaced electrode die-holders; comprising the steps of clamping one of said workpieces to one of said electrodes, loosely clamping the other of said workpieces to the other of said electrodes, applying a potential between said electrodes and moving said loosely clamped workpiece into contact with said one workpiece thereby discharging said potential through said workpieces whereby welding of said pieces is effected.

2. A method of welding in accordance with claim 1 wherein said workpieces are of small diameter and including the steps of, prior to moving said loosely clamped workpiece into contact with said fixed piece, and discharging said potential, applying a potential to said electrodes, moving said loosely clamped workpiece into contact with said fixed workpiece so as to discharge said potential through said workpieces, and removing said loosely clamped workpiece from said fixed workpiece.

3. A method of welding in accordance with claim 2 including the steps of, prior to moving said loosely clamped workpiece into contact with said fixed workpiece, and discharging said potential; applying a potential to said electrodes, moving said loosely clamped workpiece into contact with said fixed workpiece so as to discharge said potential through said workpieces, and removing said loosely clamped workpiece from said fixed workpiece.

4. A method of welding in accordance with claim 1 including the step of providing workpieces of differing metallic compositions.

5. A method of welding in accordance with claim 1 including the step of providing workpieces having differing diameters.

6. A method of welding in accordance with claim 1 wherein one of said workpieces comprises a single wire and wherein the other of said workpieces comprises a plurality of wires, and wherein said clamping step includes the step of tightly clamping said plurality of wires.

7. A method of welding in accordance with claim 1 wherein said workpieces comprise wires and including the steps of providing grooves in said electrodes to receive said wires, and aligning said grooves, and straightening said one wire as it is clamped and straightening said loosely engaged wire as it is clamped.

8. A method of welding at least two small diameter wires end to end in a capacitive discharge welding machine having a pair of fixed, spaced electrode die-holders; comprising the steps of clamping one of said wires to one of said electrodes, loosely clamping the other of said wires to the other of said electrodes, applying a potential between said electrodes and rapidly propelling said loosely engaged wire into contact with said one wire thereby discharging said potential through said wires whereby welding of said wires is effected.

9. A method of welding in accordance with claim 8 including the steps of providing a groove in each of said electrodes to receive said wires, and axially aligning said grooves prior to the clamping steps.

10. A method of welding in accordance with claim 9 including the steps of straightening said one wire as it is clamped.

11. A method of welding in accordance with claim 8 including the step of, prior to clamping, providing a point on at least one of said wires.

12. Welding apparatus for use in welding small workpieces comprising a pair of spaced electrode die-holders, each of said die-holders being in a fixed relation to the other and each having an upstanding leg portion with workpiece receiving means thereon, clamping means positioned with respect to said electrodes so as to loosely clamp at least one of said workpieces in said receiving means, and a welding pack connecting said electrodes and having means to actuate said pack whereby a potential is placed between said workpieces.

13. Welding apparatus in accordance with claim 12 wherein said workpiece receiving means comprises means defining a groove and wherein at least one of said grooves terminates in a recessed portion and said clamping means comprises a clamp pivotably mounted with respect to said groove and positioned with respect thereto so as to wipe against and thereby straighten a workpiece placed in said recessed portion.

14. Welding apparatus in accordance with claim 12 wherein said workpiece receiving means comprises a groove in the extended terminus of said upstanding leg portion, and including means to initially adjust one of said electrode die-holders with respect to the other electrode die-holder so as to permit horizontal and vertical alignment of said grooves.

15. Welding apparatus in accordance with claim 12 wherein said receiving means includes a pedestal portion on said terminal portion of said leg and having a groove in said pedestal portion, said groove in said pedestal having a rearward terminal recession, for receiving therein said workpiece.

16. Welding apparatus in accordance with claim 15 wherein at least one of said clamping means comprises a clamp having a horizontal extension pivotably secured to its associated leg by adjustment means permitting rotatable movement of said extension and vertical adjustment thereof.

17. Welding apparatus in accordance with claim 12 wherein said welding pack is a capacitive discharge, direct current welder.

18. Welding apparatus in accordance with claim 12 wherein at least one of said clamps comprises a yoke having a pair of upstanding legs supporting a clamping bar, said clamping bar alignable with said leg portion, said yoke having biasing means mounted with respect to said electrode die-holders so as to permit upward biasing thereof, and means connecting said yoke to cause said bar to register, as desired, with said leg portion.

19. Welding apparatus in accordance with claim 18 wherein said yoke includes a stem and said means comprises a foot pedal connecting said stem.

20. Welding apparatus in accordance with claim 19 wherein said welding pack is a capacitive discharge welder, and wherein said foot pedal includes a switch connected to said welding pack to thereby place a potential on said workpieces.

21. Welding apparatus in accordance with claim 20 including automatic striking mechanism having a portion positioned rearwardly of the terminus of said loosely clamped workpiece and adapted to cause said workpiece to be propelled toward said fixedly clamped workpiece.

22. Welding apparatus in accordance with claim 21 wherein said striking mechanism comprises a spring and a latch, said latch engageable with said spring to hold said spring in a cocked position and means to release said latch.

23. An article of manufacture comprising a composite wire including a first portion formed of a single wire and a second portion contiguous to the first and including a plurality of separate wire ends, said plurality of separate wire ends being connected to said single wire by a weld at a common weld point and being connected together in the area of the weld point only at the weld point.

24. An article of manufacture in accordance with claim 23 wherein the weld point is the terminal end of said single wire.

References Cited

UNITED STATES PATENTS

| 1,722,195 | 7/1929 | Bumstead et al. | 219—104 |
| 1,908,859 | 5/1933 | O'Neill | 219—104 X |
| 2,018,380 | 10/1935 | Pfeiffer | 219—104 |
| 2,363,028 | 10/1944 | Warnke | 219—104 X |
| 2,413,043 | 12/1946 | Ganci | 219—104 X |
| 2,427,727 | 9/1947 | Huntley et al. | 219—104 X |
| 2,604,570 | 7/1952 | Aversten | 219—158 |
| 2,777,046 | 1/1957 | Vang | 219—104 |
| 2,843,724 | 7/1958 | De Gaeta et al. | 219—104 X |

RICHARD M. WOOD, *Primary Examiner.*

B. A. STEIN, *Assistant Examiner.*